(12) United States Patent
Bak et al.

(10) Patent No.: US 10,746,562 B2
(45) Date of Patent: *Aug. 18, 2020

(54) METHOD, APPARATUS AND PRODUCT FOR EFFICIENT SOLUTION OF NEAREST OBJECT PROBLEMS

(71) Applicant: International Business Machines Corporation, Armonk, NY (US)

(72) Inventors: Peter Bak, Yokneam Ilit (IL); Jonathan Bnayahu, Haifa (IL); Yuval Nardi, Kibutz Kiryat Anavim (IL); Eli Packer, Givataim (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/224,838

(22) Filed: Dec. 19, 2018

(65) Prior Publication Data

US 2019/0120653 A1 Apr. 25, 2019

Related U.S. Application Data

(62) Division of application No. 15/045,261, filed on Feb. 17, 2016.

(51) Int. Cl.
*G06F 17/10* (2006.01)
*G06F 17/30* (2006.01)
(Continued)

(52) U.S. Cl.
CPC ....... *G01C 21/3679* (2013.01); *G06F 16/245* (2019.01); *G06F 16/29* (2019.01); *G06T 17/05* (2013.01)

(58) Field of Classification Search
None
See application file for complete search history.

(56) References Cited

U.S. PATENT DOCUMENTS 10,267,645 B2 * 4/2019 Bak ..................... G01C 21/3679

FOREIGN PATENT DOCUMENTS

WO 2009002020 12/2008

OTHER PUBLICATIONS

Sumit K. Nath et al., "Accurate Spatial Neighborhood Relationships for Arbitrarily-Shaped Objects Using Hamilton-Jacobi GVD", Springer Berlin Heidelberg, Image Analysis; pp. 421-431; ISBN 978-3-540-73039-2; 2007.

* cited by examiner

*Primary Examiner* — Thomas G Black
*Assistant Examiner* — Demetra R Smith-Stewart
(74) *Attorney, Agent, or Firm* — Ziv Glazberg (57) ABSTRACT

A computer-implemented method, computerized apparatus and computer program product for efficient solution of nearest object problems. A set of objects having non-point shapes representable by one or more geometric elements are obtained. For each object in the set the one or more geometric elements are sampled to obtain a set of points representing the set of objects. A Voronoi diagram is constructed for the set of points, whereby a subdivision of a space accommodating the set of objects into a plurality of cells, each cell containing a single point of the set of points and defining a region of closest neighbors of the point, is obtained. Cells containing points representing the same object are aggregated into a unified cell defining an estimated region of closest neighbors of the object.

18 Claims, 7 Drawing Sheets

(51) Int. Cl.
*G01C 21/36* (2006.01)
*G06F 16/245* (2019.01)
*G06F 16/29* (2019.01)
*G06T 17/05* (2011.01)

METHOD, APPARATUS AND PRODUCT FOR EFFICIENT SOLUTION OF NEAREST OBJECT PROBLEMS

TECHNICAL FIELD

The present disclosure relates to spatial analysis in general, and to solving nearest object problems efficiently, in particular.

BACKGROUND

In many Geographic Information System (GIS) applications, as well as in the context of ample location-based services, such as online map services, navigational tools, dating applications, or the like, a search for the nearest object of interest with respect to a given location may be a common task. For example, a user may query which restaurant, hotel, hospital, gas station, another user, or the like, is the closest to her whereabouts.

One possible solution is to compute the distance to each object and select the nearest one, i.e. the object of the shortest distance thereto. However, such solution, though simple, is highly inefficient for practical situations, as its time complexity is linear in the input size.

In case the objects in question are points, a better solution is to employ a Voronoi diagram algorithm. A Voronoi diagram is a subdivision of a given space into cells, such that the points in each zone are the nearest to a specific input point. Thus, to find out the nearest object (i.e., input point) to a query point, it suffices to locate the cell in which the query point lies. This task may be accomplished in logarithmic time, by utilizing a point-location data structure constructed based on the Voronoi cells.

However, for objects of different kinds other than points, there are no efficient solutions that are commonly available and relatively easy to implement.

BRIEF SUMMARY

One exemplary embodiment of the disclosed subject matter is a computer-implemented method comprising: obtaining a set of objects, each of which having a non-point shape representable by one or more geometric elements; sampling the one or more geometric elements of each object to obtain a set of points representing the set of objects; constructing a Voronoi diagram for the set of points, whereby obtaining a subdivision of a space accommodating the set of objects into a plurality of cells, each cell containing a single point of the set of points and defining a region of closest neighbors of the point; and aggregating cells containing points representing the same object into a unified cell defining an estimated region of closest neighbors of the object.

Another exemplary embodiment of the disclosed subject matter is a computerized apparatus having a processor, the processor being adapted to perform the steps of: obtaining a set of objects, each of which having a non-point shape representable by one or more geometric elements; sampling the one or more geometric elements of each object to obtain a set of points representing the set of objects; constructing a Voronoi diagram for the set of points, whereby obtaining a subdivision of a space accommodating the set of objects into a plurality of cells, each cell containing a single point of the set of points and defining a region of closest neighbors of the point; and aggregating cells containing points representing the same object into a unified cell defining an estimated region of closest neighbors of the object.

Yet another exemplary embodiment of the disclosed subject matter is a computer program product comprising a computer readable storage medium retaining program instructions, which program instructions when read by a processor, cause the processor to perform a method comprising: obtaining a set of objects, each of which having a non-point shape representable by one or more geometric elements; sampling the one or more geometric elements of each object to obtain a set of points representing the set of objects; constructing a Voronoi diagram for the set of points, whereby obtaining a subdivision of a space accommodating the set of objects into a plurality of cells, each cell containing a single point of the set of points and defining a region of closest neighbors of the point; and aggregating cells containing points representing the same object into a unified cell defining an estimated region of closest neighbors of the object.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem dealt with by the disclosed subject matter is to provide efficient solution to nearest object problems, involving objects of any given shape and geometric representation.

One technical solution is to sample each object in the input set to obtain a set of representative points, construct a Voronoi diagram for the entirety of the sample points, and unite areas of cells that contain sample points of the same original object. As a result, a subdivision of the space accommodating the set of objects into regions is obtained, such that a point in each region is nearest to a sample point, and by this virtue also to the respective sampled object, in most cases at least. The solution accuracy may depend on the sampling density, as well as on other factors, such as the precision level of the data types used (e.g., floating-point numbers or the like), accuracy of the real-world measures by which the input data is obtained, and the like.

In some exemplary embodiments, the disclosed subject matter may be s employed for providing results to nearest object queries. A given point, such as a geographic location or the like, may be received as input. A region in which the point lies, i.e., a unified cell obtained by aggregating cells containing sample points that belong to a single object, may be located, and an indication of the object may be returned in response. The query may be processed using a point location data structure, constructed based on the unified cells of the Voronoi diagram and allowing to determine the region where a query point is at in an efficient manner.

Notably, as the cells of a Voronoi diagram are polygonal in the planar case, the same holds also for a union of any adjacent cells thereof. Thus, an efficient point location data structure for the unified cells may be built using any of the commonly known techniques, such as slabs or trapezoidal decompositions, and the like. Also, from the same reason, the union of cells may also be considered a relatively easy task, which may be achieved by any suitable algorithm for merging polygons. There are a number of off-the-shelf software packages, such as the Computational Geometry Algorithms Library (CGAL), that provide implementation of both Voronoi diagram and polygons union computation.

Similarly, in higher dimensions, the Voronoi cells are polytopes, formed by an intersection of hyperplanes. Thus, known efficient solutions for the point location problem in three-dimensional space or higher, such as decomposition to multiple planar point location data structures, hierarchical cuttings for arrangements of hyperplanes, or the like, may be similarly adapted to be employed in the disclosed subject matter.

In some exemplary embodiments, the sampling density may be specified as an adjustable parameter, either defined by a user or automatically determined so as to achieve a desired accuracy level. For example, the parameter may relate to a sampling rate, i.e. a distance between two successive samples, such that the higher the rate the shorter the distance is and vice versa, or to a point count per unit area (or volume, where applicable), or the like. The sampling density may be either uniform or non-uniform, e.g., denser around sharp corners or high curvature sections and sparser along smooth parts, or the like. The sample points may be determined either deterministically or at random, such as by dart throwing scheme or likewise stochastic methods. The sampling density may introduce a trade-off between the solution accuracy and the cost-efficiency of the Voronoi diagram computation, as the larger the set of sample points is, the greater are the chances to get correct results, on the one hand, yet the process thus becomes more resource demanding in terms of both time and memory, on the other hand. As a rule of thumb, in order to achieve optimal results, one may use a minimal sampling density that still allows preservation of salient features of a sampled object's shape, such as, for example, cusps, turns, torsions, incontinuity or non-differentiability points, and the like.

In some exemplary embodiments, after unification of two or more Voronoi cells that correspond to the same sampled object, further operations on the unified region may be performed. For example, the set of vertex points at the boundary of the unified cell may be interpolated so as to smooth out any jagged patterns or likewise artifacts that may adversely affect or burden further processing, such as in construction of a point location data structure or the like.

One technical effect of utilizing the disclosed subject matter is to allow for an efficient solution of nearest objects problems that is applicable for any arbitrarily shaped objects and can be easily implemented using commonly available tools. The solution can be applied to any geometric element or shape representation type, including, for example: objects in vertex-based representation, such as line segments, piecewise-linear curves, polygons, meshes, polyhedrons, or the like; parametric forms, such as often used in the context of splines (piecewise-polynomial curves or surfaces); implicit representation (i.e. curves or surfaces defined as the zero-set of an arbitrary function, e.g. a circle of radius R centered at the origin may be represented as $\{(x,y)|f(x,y)=x^2+y^2-R^2=0\}$); procedural schemes, such as subdivision surfaces, fractals, or the like; volumetric or solid forms representation, such as binary space partitions (subdivisions into empty or full regions), constructive solid geometry (modelling by series of Boolean operations on solid primitives, such as cubes, spheres, cylinders, cones, pyramids, prisms, etc.), or the like; and so forth.

As an illustrative example, consider objects having a one-dimensional shape, such as line segments, trajectories, closed curves, or the like. One may sample points along each such line or curve, either uniformly or non-uniformly, in order to obtain a set of sample points, denoted herein as P. Then, a Voronoi diagram may be constructed for the set of sample points P, whereby a subdivision to cells, denoted herein as C, may be obtained. The points in each cell of C are the nearest to a specific sample point in P. Cells belonging to sample points of the same shape may be united together. When querying for nearest neighbor, being inside the united region may be indicative that the queried point is closest to one of the corresponding sampled points and thus also closer to the respective original shape than to any of the other shapes.

A similar approach may be applied to planar objects or two-dimensional shapes having a closed-form boundary, such as polygons, discs, or the like. In some exemplary embodiments, one or more objects may be solid, such that the interior of the object's shape may be considered a forbidden zone. In such cases, nearest neighbor queries may be reduced to queries as to the proximity to the boundaries of the shapes. As the boundary of each such shape is a closed curve, one may sample points along the boundary in the same manner as one-dimensional shapes are handled. The Voronoi diagram may be constructed such that the interior portions, i.e. forbidden zones, are excluded from any of the cells. The same approach may also be generalized to higher dimensions, such as, for example, by employing area sampling technique on two-dimensional boundaries of three-dimensional objects or the like.

In some exemplary embodiments, multi-dimensional sampling may be employed. For example, a two- or three-dimensional object may be sampled by computing its intersection with a regularly spaced set of points, such as a lattice, a rectangular grid, or the like. Additionally or alternatively, areas and volumes may be stochastically sampled, such as by randomly drawing coordinates in each dimension or the like.

In some exemplary embodiments, the disclosed subject matter may be utilized for computing the medial axis of a given shape. The medial axis, also referred to as the skeleton, is the set of all points having more than one closest point on the boundary of the shape. As the boundary of a unified cell of the Voronoi diagram is equidistant from the two objects it separates, the medial axis or an approximated version of it may be induced by boundary lines of united regions of a subdivision resulting from decomposing the boundary of the shape into disjoint segments, e.g. edges of a polygon, facets of a polyhedron, curved lines or surfaces, or the like, and processing all these portions as a set of separate objects in accordance with the disclosed subject matter, i.e. sampling points from each segment, constructing Voronoi diagram for the sampled points, and uniting cells of sampled points from the same segment. Any exterior regions outside of the shape may be regarded as forbidden zones excluded from the Voronoi cells, similarly as in the case of solid objects and their interior portions. The medial axis may be useful in many other applications such as shape reconstruction, dimension reduction, or the like.

Figure 1:
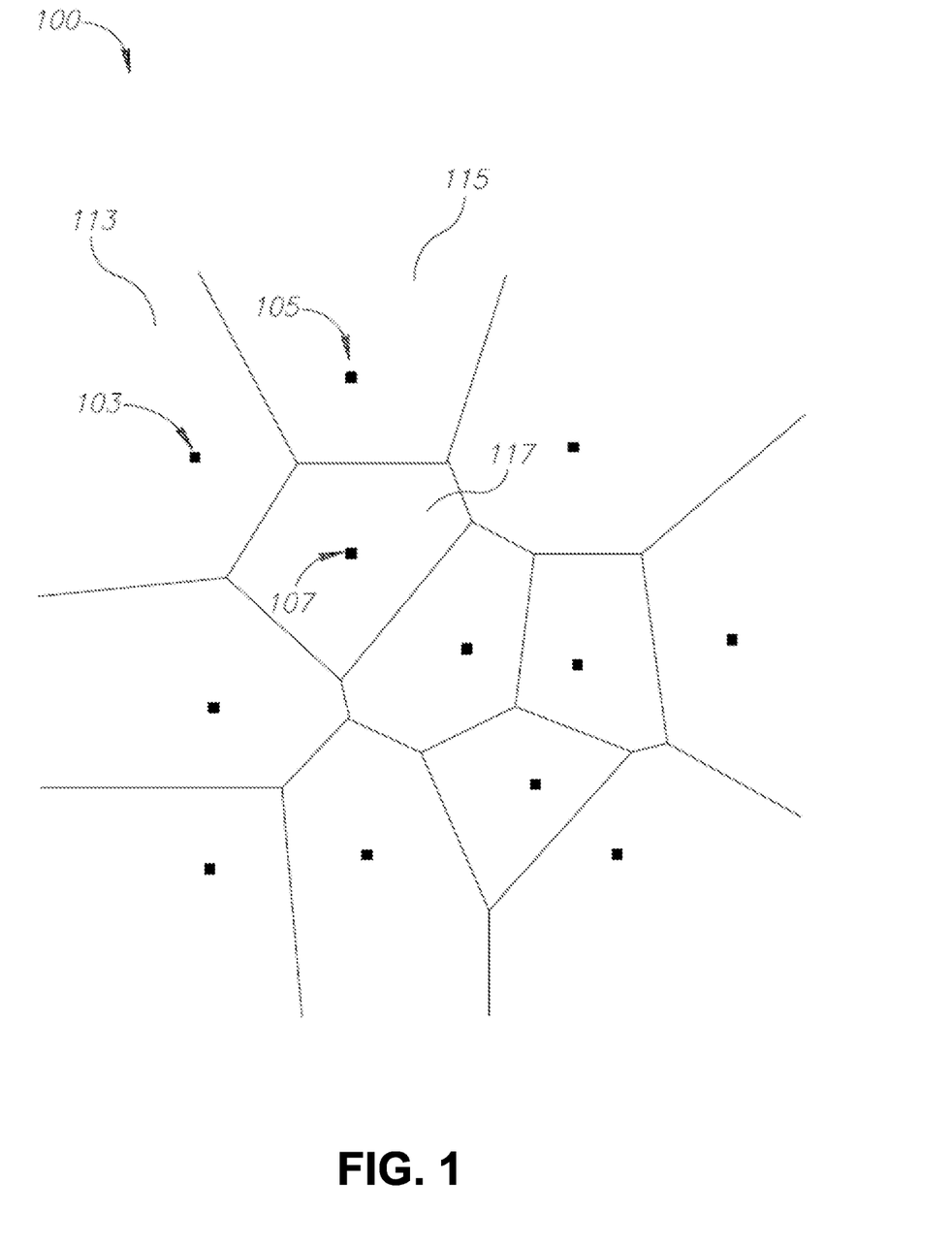
FIG. 1 shows a schematic illustration of a Voronoi diagram of a set of points, in accordance with some exemplary embodiments of the subject matter.

Referring now to FIG. 1 showing a schematic illustration of a Voronoi diagram of a set of points, in accordance with some exemplary embodiments of the subject matter.

A Voronoi Diagram 100 may be constructed for a set of input points, such as Point 103, Point 105 and Point 107, also referred to as seeds, sites or generators. Voronoi Diagram 100 forms a partitioning of the plane into cells, such as Cell 113, Cell 115 and Cell 117. Each cell of Voronoi Diagram 100 contains all points that are nearest neighbors of the input point that lies in that cell. For example, Cell 113 contains all points that are closest to Point 103 than to any other point in input set, Cell 115 contains all points that are the closest to Point 105, and so forth. Cells of Voronoi Diagram 100 may be either bounded, such as Cell 117, or unbounded, such as Cells 113 and 115.

Each of the boundary lines of the cells of Voronoi Diagram 100 is the locus of points that are equidistant from two of the input points. For example, the boundary line between Cells 113 and 115 contains all points that are equidistant from Points 103 and 105, the boundary line that separates Cells 113 and 117 is equidistant from Points 103 and 107, and so forth.

While for illustrative purposes only, Voronoi Diagram 100 is exemplified in FIG. 1 as two-dimensional, the disclosed subject matter however is not limited to a particular dimension. In addition, while Voronoi Diagram 100 of FIG. 1 relates to Euclidean distance metric, the disclosed subject matter however is not limited in such manner and may employ any other metric of choice, such as Manhattan distance, Chebyshev distance, Minkowski distance, or the like.

Figure 2A:
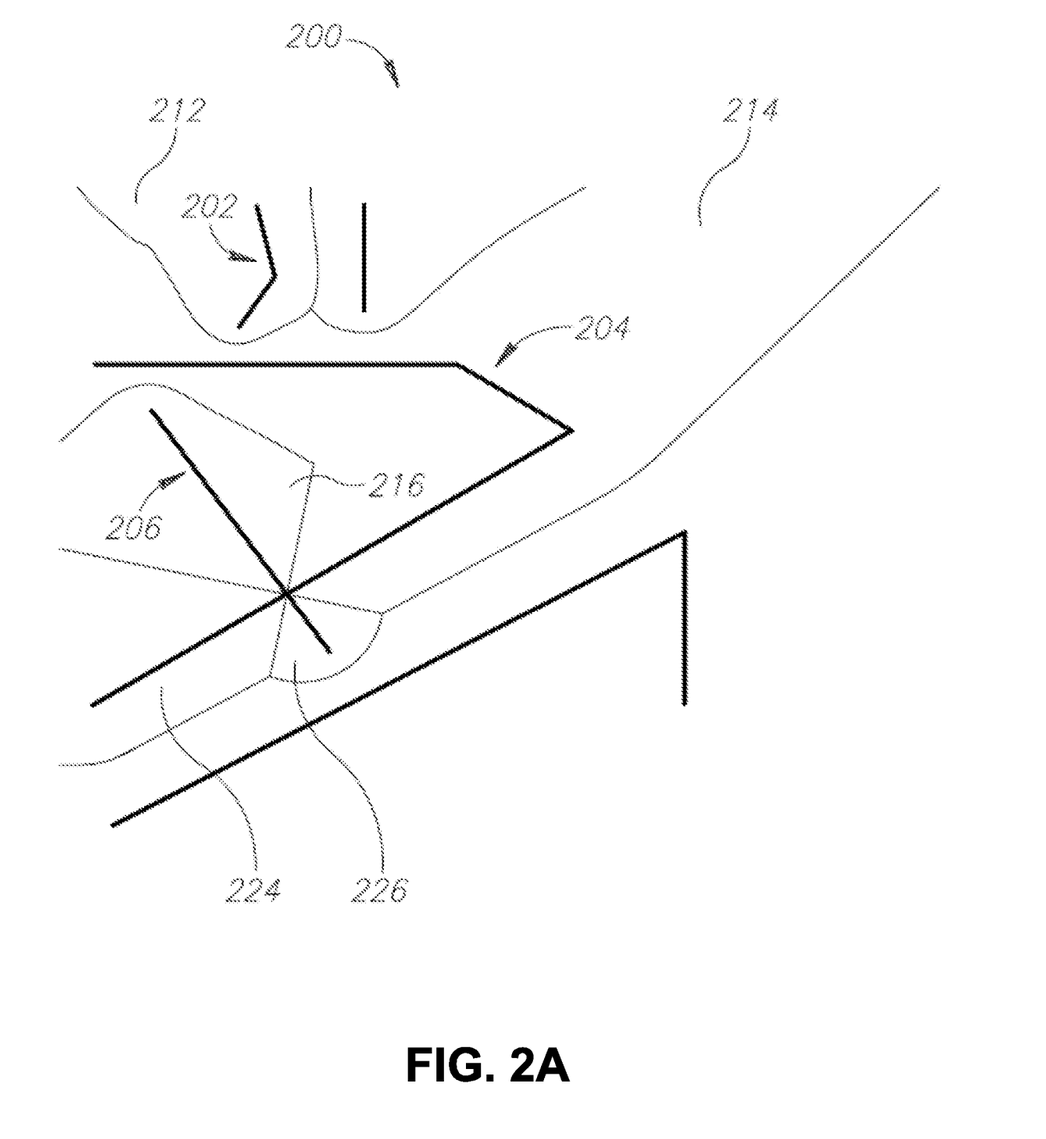
FIG. 2A shows a schematic illustration of a Voronoi diagram of a set of polygonal lines, in accordance with some exemplary embodiments of the disclosed subject matter.

Referring now to FIG. 2A showing a schematic illustration of a Voronoi diagram of a set of polygonal lines, in accordance with some exemplary embodiments of the disclosed subject matter.

A Voronoi Diagram 200 may be constructed for a set of input objects, such as Object 202, Object 204 and Object 206.

Objects 202 to 206, as well as all other objects exemplified in FIG. 2A, may be polygonal lines, also referred to as piecewise linear curves or line-strings, each of which being composed of a sequence of line segments connected to one another. However, the disclosed subject matter is neither limited to straight line shapes nor to one-dimensional shapes, and may be employed to objects of any arbitrary shape. For example, a one-dimensional object such as a line trajectory may comprise one or more curved line segments, e.g. arcs, conic sections, polynomial curves, cycloids, or the like. In addition, one or more objects may be multi-dimensional, such as, for example, discs, solid polygons, and likewise free-form planar objects in a two- or three-dimensional space, polyhedrons, spheres, ellipsoids, toroids, or any free-form shape, whether hollow or solid, in a three-dimensional space, or complex objects in higher dimensions, e.g., deformable objects with a shape varying in time, or the like.

Voronoi Diagram 200 may subdivide the plane into cells, such as Cell 212, Cell 214, Cell 216, Cell 224 and Cell 226. Objects in the input set may cross or otherwise overlap one another, such as Objects 204 and 206. Each cell may comprise all points that are closer to one of the objects in the input set than to any of the others. For example, Cell 212 may comprise all points that are nearest neighbors of Object 202, Cells 214 and 224 may comprise all points that are nearest neighbors of Object 204, and Cells 216 and 226 may comprise all points that are nearest neighbors of Object 206.

Figure 2B:
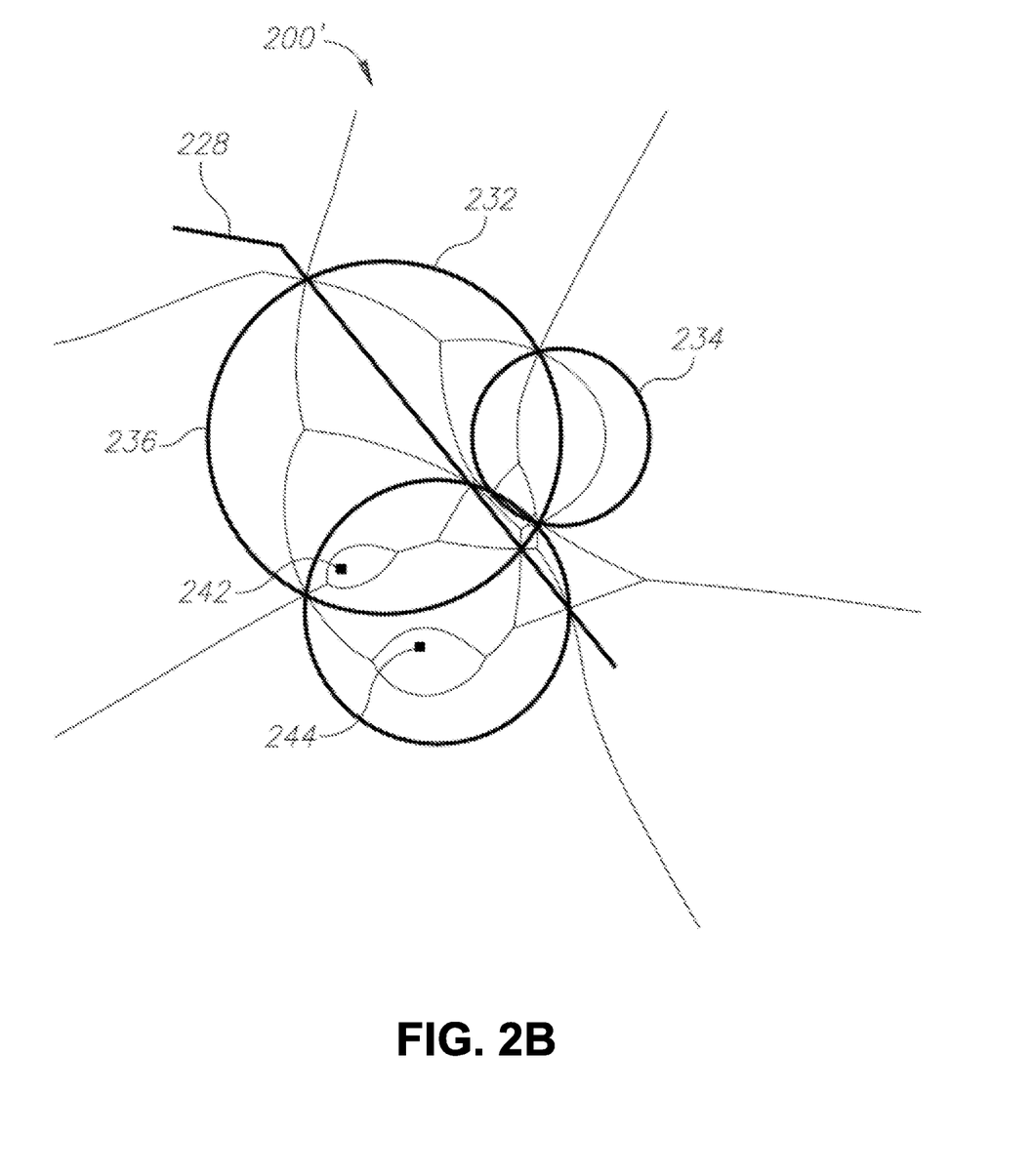
FIG. 2B shows a schematic illustration of a Voronoi diagram of a set of various objects, in accordance with some exemplary embodiments of the disclosed subject matter.

Referring now to FIG. 2B showing a schematic illustration of a Voronoi diagram of a set of various objects, in accordance with some exemplary embodiments of the disclosed subject matter.

A Voronoi Diagram 200' may be constructed for a set of objects, such as Object 228, Object 232, Object 234, Object 236, Object 242 and Object 244. The set may comprise objects having different kinds of shapes: Objects 232, 234 and 236 are circles, and Objects 242 and 244 are points. Voronoi Diagram 200' may partition the space to a plurality of cells, such that each cell contains all points that are the closest to one object over all other objects, similarly as Voronoi Diagram 200 of FIG. 2A.

Figure 3:
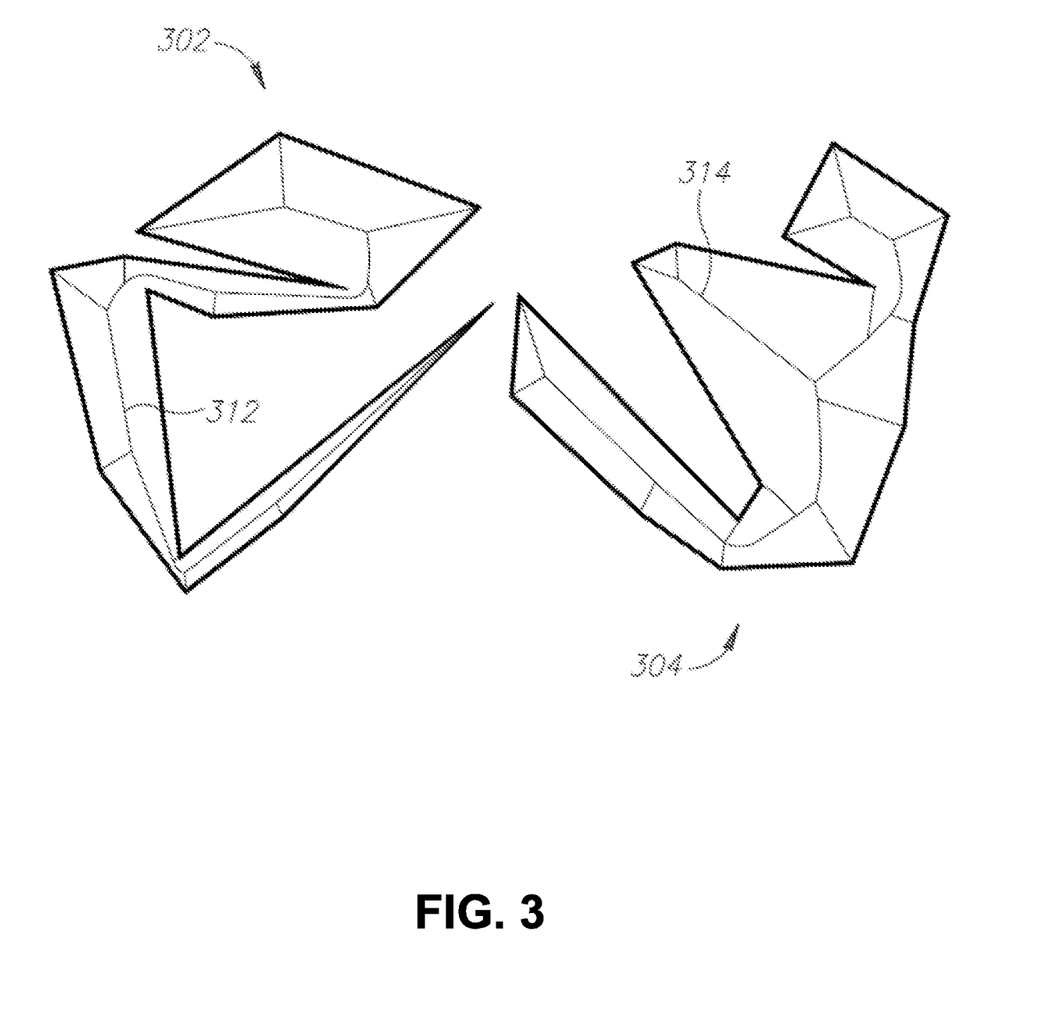
FIG. 3 shows a schematic illustration of Voronoi diagrams of polygon edges, in accordance with some exemplary embodiments of the disclosed subject matter.

Referring now to FIG. 3 showing a schematic illustration of Voronoi diagrams of polygon edges, in accordance with some exemplary embodiments of the disclosed subject matter.

A multi-dimensional shape, such as Polygon 302 and Polygon 304, may comprise a boundary portion representable by a disjoint union of one or more shapes of a lower dimension. For example, each of Polygons 302 and 304 may have a boundary composed of a plurality of straight line edges. Voronoi Diagram 312 may subdivide the region enclosed by the boundary of Polygon 302 into cells, each of which comprising all points that are nearest neighbors of one of the edges of Polygon 302. Similarly, Voronoi Diagram 314 may subdivide the interior of Polygon 304 into cells that comprise all closest points to one of the edges of Polygon 304. Thus, the medial axes of Polygons 302 and 304, or an estimation thereof, may be obtained based on the boundaries of the cells of Voronoi Diagrams 312 and 314.

Voronoi Diagrams such as 312 and 314 may be obtained by considering the plurality of disjoint segments forming the boundary of one or more multi-dimensional shapes as a set of separate objects on which the disclosed subject matter may be utilized. For example, each of the edges of Polygons 302 and 304 as a single object. Accordingly, after sampling each of the edges of Polygons 302 and 304 and constructing Voronoi diagram for the sampled points, such as Voronoi Diagram 100 of FIG. 1, all cells that belong to the same edge may be united together, to obtain a result such as Voronoi Diagrams 312 and 314. In addition, Voronoi Diagrams 312 and 314 may be bounded by the edges of Polygons 302 and 304 respectively. For example, exterior regions outside of Polygons 302 and 304 may be excluded from any of the cells of Voronoi Diagrams 312 and 314.

Figure 4:
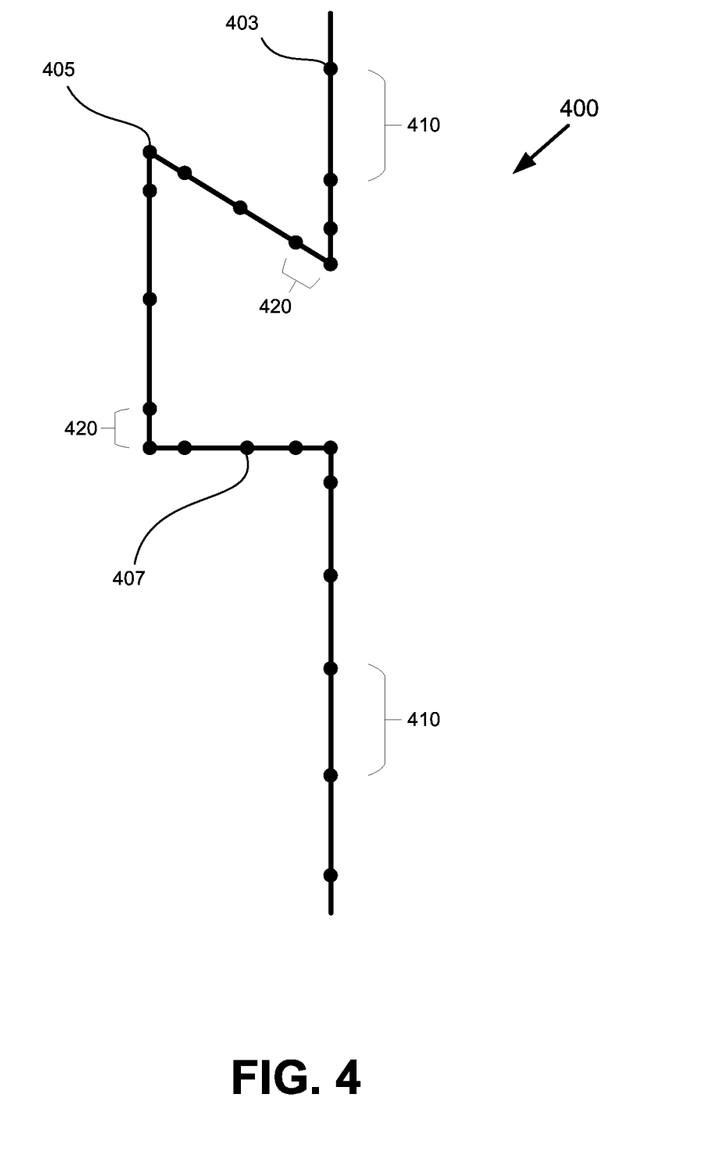
FIG. 4 shows a schematic illustration of a sampling pattern of an object, in accordance with some exemplary embodiments of the disclosed subject matter.

Referring now to FIG. 4 showing a schematic illustration of a sampling pattern of an object, in accordance with some exemplary embodiments of the disclosed subject matter.

An Object 400 may be sampled to obtain a set of sample points, such as Point 403, Point 405 and Point 407. Object 400 may be exemplified as a polygonal line, however the disclosed subject matter is not limited in such manner and may be employed to objects of any arbitrary shape and dimension. Object 400 may be sampled at varying density in accordance with the properties of its shape. For example, a s relatively low density, Density 410, may be employed to sample Object 400 along smooth portions, while a relatively high density, Density 420, may be employed to sample Object 400 along portions with high variability, such as sharp angles and turns. In some exemplary embodiments, the sampling density may be uniform. For example, Object 400 may be sampled using only the low density, Density 410, in order to conserve resources, or using only the high density, Density 420, in order to achieve better accuracy without detecting or keeping track of the shape features of Object 400 explicitly.

Figure 5:
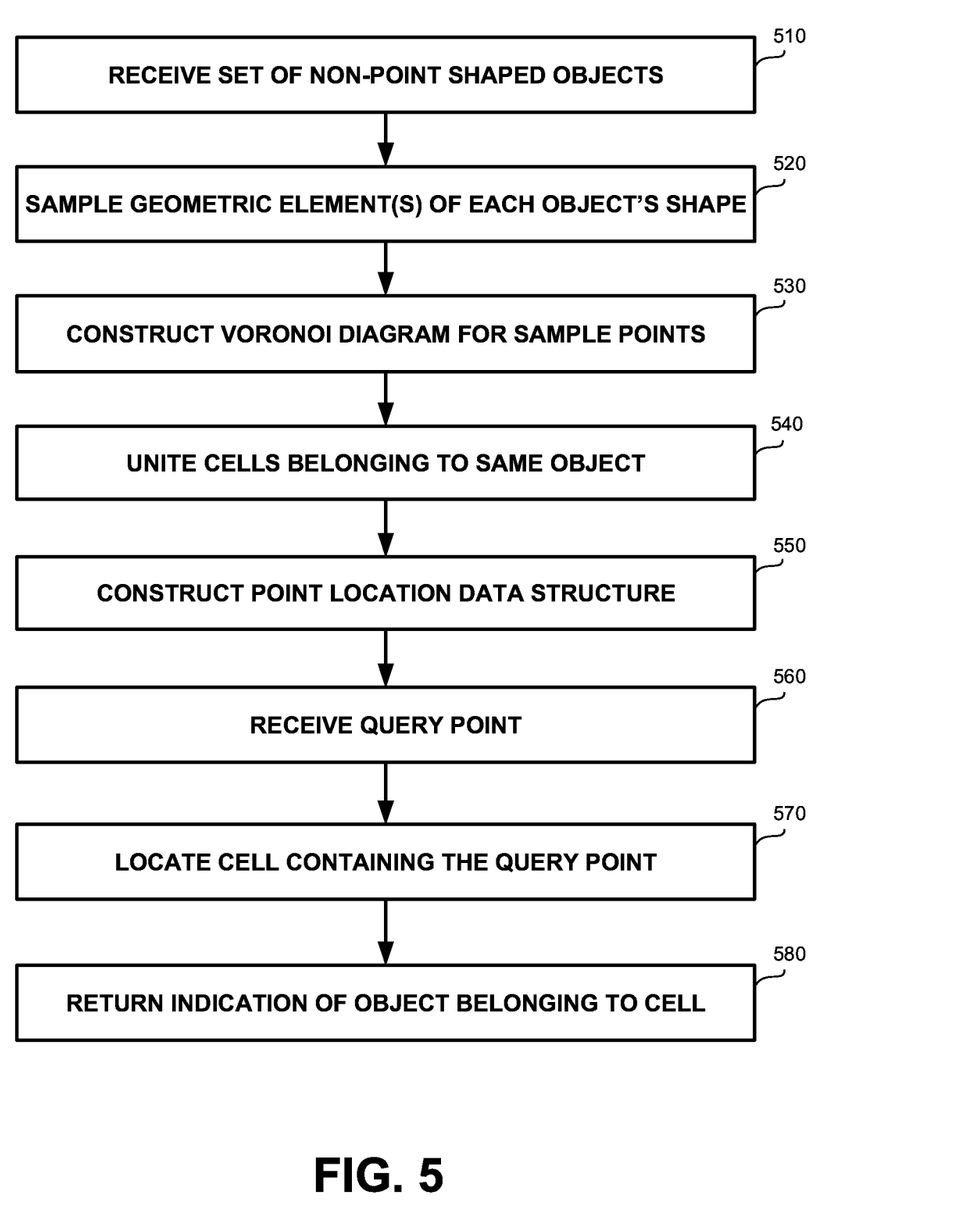
FIG. 5 shows a flowchart diagram of a method, in accordance with some exemplary embodiments of the disclosed subject matter.

Referring now to FIG. 5 showing a flowchart diagram of a method in accordance with some exemplary embodiments of the disclosed subject matter.

On Step 510, a set of objects having a non-point shape representable by one or more geometric elements may be received. The objects may have any arbitrary shape and dimension in any form of representation, such as, for example, lines, curves, trajectories, closed curves, and likewise one-dimensional objects; polygons, multipolygons, discs, free-from surfaces and likewise planar objects; polyhedrons, spheres, cylinders, cones, toroids, ellipsoids, or any free-form three-dimensional object; and so forth. The representation may be vertex-based, parametric, implicit, procedural, volumetric, or the like.

On Step 520, for each object, the one or more geometric elements representing the shape of the object may be sampled to obtain a set of sample points. The sampling may be performed in a pattern that corresponds to the shape of the object, such as the sampling pattern illustrated in FIG. 4. The sampling may be performed at either a uniform or non-uniform density. Additionally or alternatively, the sampling density may be designed to preserve features of the object's shape, such as cusps, jagged lines, or the like. The sampling may be performed using either deterministic or stochastic schemes.

On Step 530, a Voronoi diagram may be constructed for the set of sample points obtained on Step 520, such as Voronoi Diagram 100 of FIG. 1. The Voronoi diagram for the set of sample points may be computed using known methods for computing Voronoi diagram of points, such as discussed in: Steven Fortune, "Voronoi Diagrams and Delaunay Triangulations", Handbook of Discrete and Computational Geometry, pages 377-388, CRC Press, Inc., 1997; Mark de Berg, Otfried Cheong, Marc s van Kreveld van Mark Overmars, "Computational Geometry: Algorithms and Applications", 3rd ed., Springer-Verlag TELOS, 2008 (hereinafter "de Berg et al").

On Step 540, cells of the Voronoi diagram constructed on Step 530, in which the sampled points belong to the same object, may be united. The united cells may be cells adjacent to one another, i.e. having one or more joint boundaries. The union of cells may be performed using known methods for computing union of polygons (or polyhedrons, where applicable), such as discussed in de Berg et al. In some exemplary embodiments, further operations may be performed on the unified cells, such as boundary smoothing or the like.

On Step 550, a point location data structure may be constructed for the unified Voronoi cells as obtained by performing Step 540. The point location data structure may be built using known techniques, such as disclosed by de Berg et al. The point location data structure may be adapted to allow the locating of a sub-region (i.e., unified cell) that contains a given query point, in an efficient manner, e.g., in logarithmic time in the size of the set of objects.

On Step 560, a query point may be received. The query point may be indicated in a nearest object query. The query point may specify a location in space, that one may be interested in determining which of the objects in the set received on Step 510 is the closest thereto.

On Step 570, a unified cell of the Voronoi diagram that contains the query point received on Step 560 may be located. The cell may be located using the point location data structure constructed on Step 550.

On Step 580, an indication of the object to which the cell located on Step 570 belongs, may be returned. The indication may be returned in response to a nearest object query indicating the query point received on Step 560.

Figure 6:
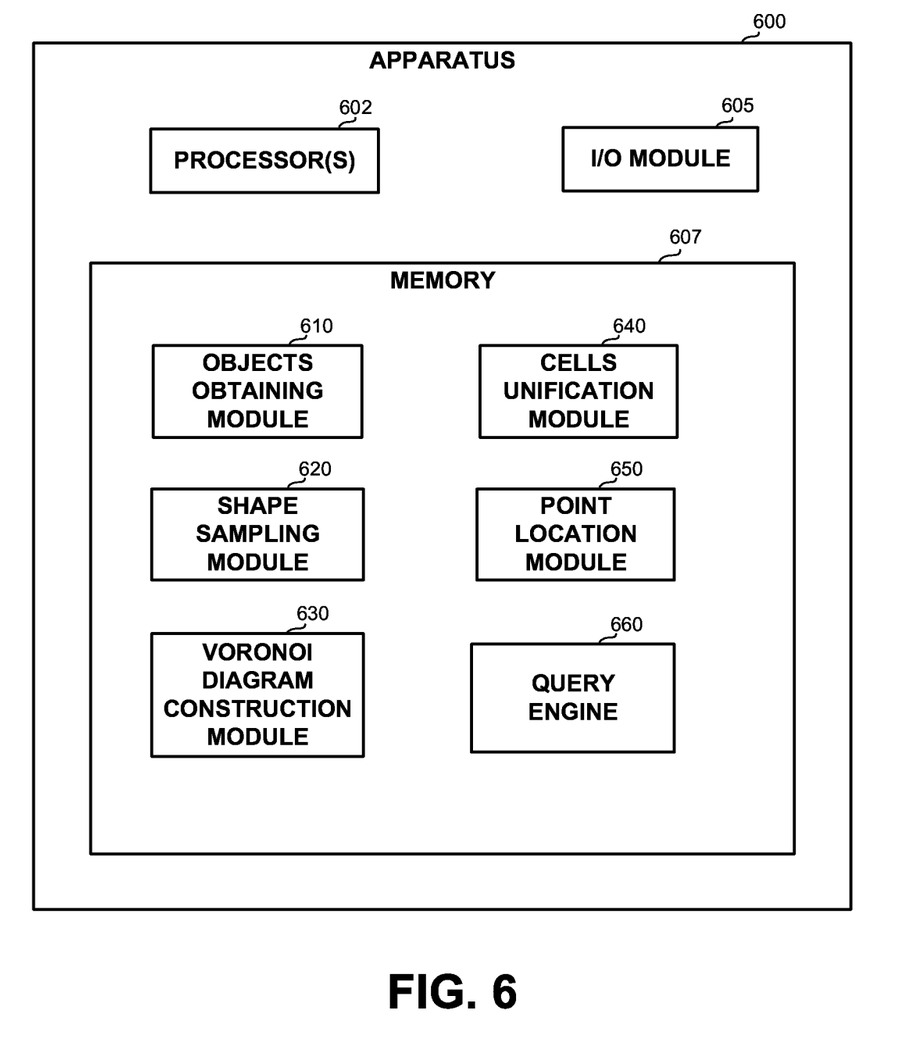
FIG. 6 shows a block diagram of an apparatus, in accordance with some exemplary embodiments of the disclosed subject matter.

Referring now to FIG. 6 showing a block diagram of an apparatus in accordance with some exemplary embodiments of the disclosed subject matter.

In some exemplary embodiments, Apparatus 600 may comprise one or more Processor(s) 602. Processor 602 may be a Central Processing Unit (CPU), a microprocessor, an electronic circuit, an Integrated Circuit (IC) or the like. Processor 602 may be utilized to perform computations required by Apparatus 600 or any of it subcomponents.

In some exemplary embodiments of the disclosed subject matter, Apparatus 600 may comprise an Input/Output (I/O) Module 605. I/O Module 605 may be utilized to provide an output to and receive input from a user or another Apparatus 600 in communication therewith.

In some exemplary embodiments, Apparatus 600 may comprise a Memory 607. Memory 607 may be a hard disk drive, a Flash disk, a Random Access Memory (RAM), a memory chip, or the like. In some exemplary embodiments, Memory 607 may retain program code operative to cause Processor 602 to perform acts associated with any of the subcomponents of Apparatus 600.

Objects Obtaining Module 610 may be configured for receiving a set of objects of arbitrary shape, dimension or representation type, such as on Step 510 of FIG. 5. The shape of an object received by Objects Obtaining Module 610 may be comprised of one or more geometric elements, such as lines, curves, polygons, manifolds, solid primitives, or the like.

Shape Sampling Module 620 may be configured for sampling, for each of the objects received by Objects Obtaining Module 610, the one or more geometric elements representative of the object's shape, whereby obtaining a set of sample points, such as on Step 520 of FIG. 5. Shape Sampling Module 620 may be configured to perform the sampling in either uniform or non-uniform density. Shape Sampling Module 620 may employ either deterministic or stochastic sampling schemes. Shape Sampling Module 620 may be configured to sample a shape of an object such that the features of the shape are preserved by the sampled points and can be reconstructed therefrom.

Voronoi Diagram Construction Module 630 may be configured to construct a Voronoi diagram for a set of points, such as the set of sample points obtained by Shape Sampling Module 620, similarly as in Step 530 of FIG. 5. Voronoi Diagram Construction Module 630 may be configured to construct the Voronoi diagram in accordance with any metric of choice, such as Euclidian distance metric, Minkowski distance metric, or the like.

In some exemplary embodiments, Voronoi Diagram Construction Module 630 may be configured to regard certain regions as forbidden zones excluded from any of the Voronoi cells. For example, one or more objects may have a multi-dimensional shape with solid interior, such that no query point may lie inside these inner regions. As another example, the set of objects may represent disjoint segments that form the boundary of one or more geometric shapes for which one is interested in computing a medial axis transform. Thus, the space to be subdivided by a Voronoi diagram may be confined to the region enclosed by the shape's boundary.

Cells Unification Module 640 may be configured for uniting cells of the Voronoi diagram constructed by Voronoi Diagram Construction Module 630 that belong to the same object, such as in Step 540 of FIG. 5. In some exemplary embodiments, Cells Unification Module 640 may unite cells using a polygon union algorithm. Cells Unification Module 640 may be further configured for performing smoothing or simplification operation on the boundary of one or more unified cells, such as by employing interpolation or similar method.

Point Location Module 650 may be configured for locating a unified cell of the Voronoi diagram obtained by Cells Unification Module 640, in which a given query point lies, such as in Step 570 of FIG. 5. In some exemplary embodiments, Point Location Module 650 may be further configured to construct a point location data structure for the unified cells, such as in Step 550 of FIG. 5, and employ it to locate the cell containing the query point.

Query Engine 660 may be configured for processing nearest object queries, such as, for example, queries seeking to ascertain which of the objects received by Objects Obtaining Module 610 is the closest to a specified location. Query Engine 660 may be configured to receive a query point, such as on Step 560 of FIG. 5, and to return in response an indication of the object belonging to the cell containing the query point, as located by Point Location Module 650, such as in Step 580 of FIG. 5.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining, by a processor, a set of objects, each of which having a non-point shape representable by one or more geometric elements;
   automatically sampling the one or more geometric elements of each object to obtain a set of points representing the set of objects;
   automatically constructing a Voronoi diagram for the set of points, whereby obtaining a subdivision of a space accommodating the set of objects into a plurality of cells, each cell containing a single point of the set of points and defining a region of closest neighbors of the point;
   automatically aggregating cells containing points representing the same object into a unified cell defining an estimated region of closest neighbors of the object;
   obtaining a query indicating an input point, wherein the query comprises a request to find a target object that is nearest to the input point; and
   in response to the query, providing an indication of the target object that is nearest to the input point, wherein the target object comprises an object belonging to a unified cell comprising the input point.

2. The method of claim 1, wherein the target object is selected from the group consisting of: a restaurant, a hotel, a hospital, a gas station, and another user.

3. The method of claim 1, wherein the query is processed using a point location data structure constructed based on the Voronoi diagram.

4. The method of claim 1, wherein said sampling is performed in a density so as to preserve at least one feature of the one or more geometric elements.

5. The method of claim 1, wherein at least one of the objects is of a multi-dimensional shape having a boundary, wherein the interior thereof is regarded as forbidden zone excluded from any unified cell.

6. The method of claim 1, wherein the one or more geometric elements are selected from the group consisting of: lines; curves; polygons; discs; planar surfaces; curved surfaces; and solid shape primitives.

7. The method of claim 1, wherein the set of objects comprises at least two objects which shapes are represented by different kinds of geometric elements.

8. The method of claim 1, wherein a shape representation type of an object in the set is selected from the group consisting of: vertex-based; parametric; implicit; procedural; and volumetric.

9. The method of claim 1, wherein the set of objects is composed of disjoint segments of a boundary of one or more multi-dimensional shapes, wherein the exterior thereof is regarded as forbidden zone excluded from any unified cell, whereby an estimation of the medial axis of the one or more multi-dimensional shapes by the boundaries of the respective unified cells is obtained.

10. An apparatus comprising a processor, the processor being adapted to perform the steps of:
    obtaining, by the processor, a set of objects, each of which having a non-point shape representable by one or more geometric elements;
    automatically sampling the one or more geometric elements of each object to obtain a set of points representing the set of objects;
    automatically constructing a Voronoi diagram for the set of points, whereby obtaining a subdivision of a space accommodating the set of objects into a plurality of cells, each cell containing a single point of the set of points and defining a region of closest neighbors of the point;
    automatically aggregating cells containing points representing the same object into a unified cell defining an estimated region of closest neighbors of the object;
    obtaining a query indicating an input point, wherein the query comprises a request to find a target object that is nearest to the input point; and
    in response to the query, providing an indication of the target object that is nearest to the input point, wherein the target object comprises an object belonging to a unified cell comprising the input point.

11. The apparatus of claim 10, wherein the target object is selected from the group consisting of: a restaurant, a hotel, a hospital, a gas station, and another user.

12. The apparatus of claim 10, wherein the processor is further adapted to perform the sampling in a density so as to preserve at least one feature of the one or more geometric elements.

13. The apparatus of claim 10, wherein at least one of the objects is of a multi-dimensional shape having a boundary, wherein the interior thereof is regarded as forbidden zone excluded from any unified cell.

14. The apparatus of claim 10, wherein the one or more geometric elements are selected from the group consisting of: lines; curves; polygons; discs; planar surfaces; curved surfaces; and solid shape primitives.

15. The apparatus of claim 10, wherein the set of objects comprises at least two objects which shapes are represented by different kinds of geometric elements.

16. The apparatus of claim 10, wherein a shape representation type of an object in the set is selected from the group consisting of: vertex-based; parametric; implicit; procedural; and volumetric.

17. The apparatus of claim 10, wherein the set of objects is composed of disjoint segments of a boundary of one or more multi-dimensional shapes, wherein the exterior thereof is regarded as forbidden zone excluded from any unified cell, whereby an estimation of the medial axis of the one or more multi-dimensional shapes by the boundaries of the respective unified cells is obtained.

18. A computer program product comprising a computer readable storage medium retaining program instructions, which program instructions when read by a processor, cause the processor to perform a method comprising:

obtaining, by the processor, a set of objects, each of which having a non-point shape representable by one or more geometric elements;

automatically sampling the one or more geometric elements of each object to obtain a set of points representing the set of objects;

automatically constructing a Voronoi diagram for the set of points, whereby obtaining a subdivision of a space accommodating the set of objects into a plurality of cells, each cell containing a single point of the set of points and defining a region of closest neighbors of the point;

automatically aggregating cells containing points representing the same object into a unified cell defining an estimated region of closest neighbors of the object;

obtaining a query indicating an input point, wherein the query comprises a request to find a target object that is nearest to the input point; and in response to the query, providing an indication of the target object that is nearest to the input point, wherein the target object comprises an object belonging to a unified cell comprising the input point.

* * * * *